US009987799B2

(12) United States Patent
Johnson

(10) Patent No.: US 9,987,799 B2
(45) Date of Patent: Jun. 5, 2018

(54) CURING DEVICE FOR ADDITIVE MANUFACTURING SYSTEMS DEPOSITED IN 3D SPACE

(71) Applicant: PALO ALTO RESEARCH CENTER INCORPORATED, Palo Alto, CA (US)

(72) Inventor: David Mathew Johnson, San Francisco, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 193 days.

(21) Appl. No.: 15/055,967

(22) Filed: Feb. 29, 2016

(65) Prior Publication Data

US 2017/0246803 A1  Aug. 31, 2017

(51) Int. Cl.
| | |
|---|---|
| *B29C 64/20* | (2017.01) |
| *B29C 67/00* | (2017.01) |
| *B29C 35/08* | (2006.01) |
| *B29K 101/10* | (2006.01) |
| *B33Y 30/00* | (2015.01) |
| *B29C 64/236* | (2017.01) |
| *B29C 64/232* | (2017.01) |
| *B29C 64/241* | (2017.01) |

(52) U.S. Cl.
CPC ...... *B29C 67/0066* (2013.01); *B29C 35/0805* (2013.01); *B29C 64/20* (2017.08); *B29C 67/007* (2013.01); *B29C 67/0092* (2013.01); *B29C 64/232* (2017.08); *B29C 64/236* (2017.08); *B29C 64/241* (2017.08); *B29C 2035/0827* (2013.01); *B29C 2035/0838* (2013.01); *B29K 2101/10* (2013.01); *B33Y 30/00* (2014.12)

(58) Field of Classification Search
CPC ............ B29C 67/0066; B29C 67/0092; B29C 2035/0822; B29C 2035/0827; B29C 2035/0838; B29C 64/20; B29C 64/232; B29C 64/236; B29C 64/241; B33Y 10/00; B33Y 30/00
USPC ............................................. 425/375, 174.4
See application file for complete search history.

(56) References Cited

U.S. PATENT DOCUMENTS

| | | | | |
|---|---|---|---|---|
| 2005/0275129 A1* | 12/2005 | Sambu | ............... | A61C 13/0013 264/113 |
| 2012/0133080 A1* | 5/2012 | Moussa | .................. | B33Y 10/00 264/308 |
| 2016/0151982 A1* | 6/2016 | Sand | ...................... | B33Y 70/00 428/201 |

FOREIGN PATENT DOCUMENTS

JP          H11-10575        *  1/1999

OTHER PUBLICATIONS

Katsumata et al. (JPH11-10575) machine translation JAP to ENG.*

(Continued)

*Primary Examiner* — Matthew J Daniels
*Assistant Examiner* — Lawrence D. Hohenbrink, Jr.
(74) *Attorney, Agent, or Firm* — Marger Johnson

(57) ABSTRACT

A curing device includes a curing platform having at least one curing component arranged on a surface of the curing platform facing a print direction and at least one actuator connecting the curing platform to a dispensing tip. A three dimensional printing system includes a reservoir of curable material, a dispensing tip connected to the reservoir, a curing platform surrounding the dispensing tip, the curing platform having at least one curing component arranged on a surface of the curing platform facing a print direction, and at least one actuator connecting the curing platform to the dispensing tip.

21 Claims, 9 Drawing Sheets

(56) References Cited

OTHER PUBLICATIONS

3D Potter "3D Printing UV Paste composite" (https://www.youtube.com/watch?v=of7TAH_NZBU), published Jan. 7, 2015, screen capture taken Oct. 30, 2017.*

* cited by examiner

CURING DEVICE FOR ADDITIVE MANUFACTURING SYSTEMS DEPOSITED IN 3D SPACE

FIELD OF THE INVENTION

This disclosure relates to additive manufacturing, more particularly to additive manufacturing with curing capabilities.

BACKGROUND

Traditional 3D printing systems typically user layer-by-layer construction to build up an object. A 3D printing system typically breaks the object down into 2D slices and lays them down, one layer at a time. If the material is a UV or thermoset material, the system will cure the slices prior to laying down the next slices.

These systems may involve multi-jet modeling systems that print UV polymers out of an inkjet printhead. The curing lamp typically follows the print head in the print direction in one axis. Since the system consistently moves along a single axis, fixing the print heads in location to the UV curing lamp to get a consistent cure becomes a relatively simple task, regardless of the device under construction.

A new class of printers have emerged that use 6-axis robots to deposit material in space. These machines have the capability of printing non-planar layers, which can increase the efficiency of the build and enable greater functionality of the deposition process. These systems usually work in one of two ways. In one approach, they cure along the print axis, so from the perspective of the deposition head the motion essentially looks one dimensional. Other systems exist that print in complete 3D space, where the printing path can follow any path in 3D dimensions. These systems have typically been limited to material systems in which the material solidifies without the need for additional input energy, which has restricted the material set significantly.

The ability to use 6-axis additive manufacturing systems with UV and thermoset materials, which require outside energy to solidify, would have many uses. It also useful to be able to control when the material cures. Ideally the material would cure slightly after is has been deposited on the substrate. This allows the material to merge and bond to the adjacent layers and increase the overall mechanical strength of the part.

SUMMARY

One embodiment consists of a curing device includes a curing platform having at least one curing component arranged on a surface of the curing platform facing a print direction and at least one actuator connecting the curing platform to a dispensing tip.

Another embodiment consists of a three dimensional printing system includes a reservoir of curable material, a dispensing tip connected to the reservoir, a curing platform surrounding the dispensing tip, the curing platform having at least one curing component arranged on a surface of the curing platform facing a print direction, and at least one actuator connecting the curing platform to the dispensing tip.

Another embodiment consists of a curing device having a curing platform having at least one curing component arranged on a surface of the curing platform facing a print direction, three linear actuators connecting the curing platform to a dispensing tip, and a ball joint connecting the actuator to the curing platform.

DETAILED DESCRIPTION OF THE EMBODIMENTS

Figure 1:
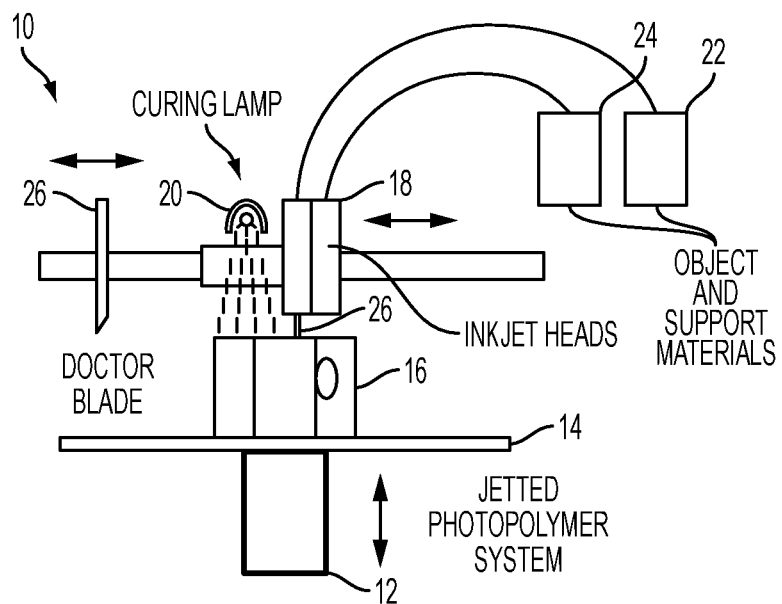
FIG. 1 shows a prior art embodiment of a photopolymer deposition system.

FIG. 1 shows a currently available photopolymer deposition system 10. The system has a manufacturing table 12 that can move up and down as needed, and a deposition surface 14. The object under construction 16 results from the print head 18 that deposits the material for the object and any supporting materials from reservoirs 22 and 24. The curing system 20 follows the print head, typically along the same axis of travel as the print head. The curing system 20 cures the deposited polymer at a fixed point in space and time from the printhead. Since the printhead follows the same linear, single axis path each time it prints, the spacing between the printhead and curing system can be fully optimized.

Figure 2:
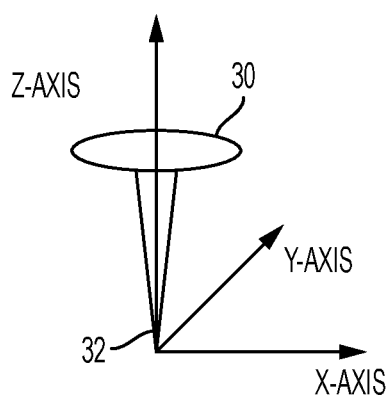
FIG. 2 shows an axis diagram relative to a deposition point.
Figure 4:
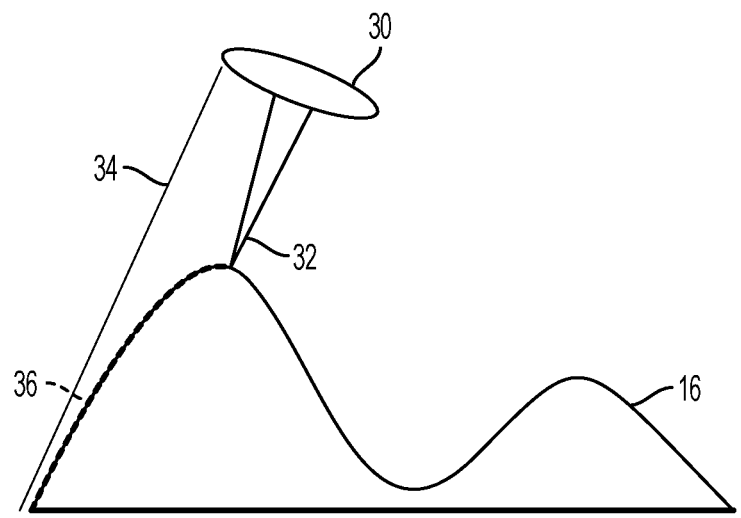
Figure 5:
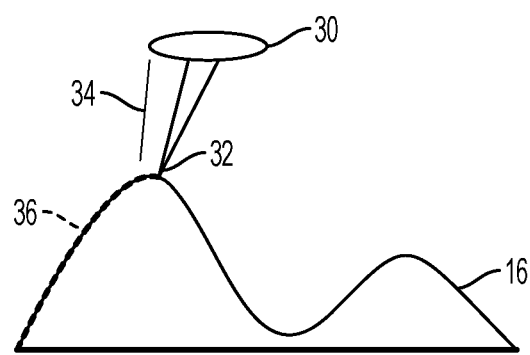

With the advent of 6-axis, robotic deposition heads, the need exists for the curing device to move independently of the deposition, or print, head in more axes of motion. FIG. 2 shows a diagram of the three linear axes of motion, x-y-z. The disk 30 represents the print head and point 32 represents the point of deposition. The embodiments here detail a curing system for a 6-axis robotic system integrated into the deposition head, but with independent motion. With an offset curing system, such as a laser, held in a fixed position relative to a print head along a non-planar path, the laser spot position has inconsistent fixing points, as shown in FIGS. 3-5.

Figure 3:
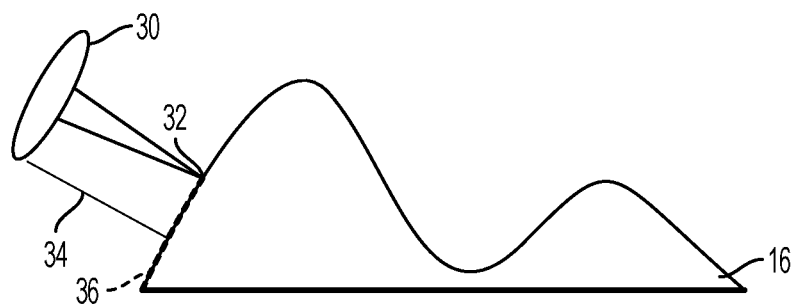
FIGS. 3-5 show representations of an object under construction relative to the axis of deposition.

In FIG. 3, as the print head 30 moves, it leaves behind the deposited material 36. The curing component directs a beam of light 34 to cure the material 36. The curing component, such as a laser, has a fixed spatial relationship with the deposition point 32. This works in some positions, but not in others. As shown in FIG. 3, the light 34 (or heat) reaches the deposited material as intended. However, as shown in FIG. 4, the light or heat does not strike any of the deposited material. In FIG. 5, it now strikes the material again, but a significant portion of the material between the two points in FIG. 3 and FIG. 5 does not receive any curing energy.

Figure 6:
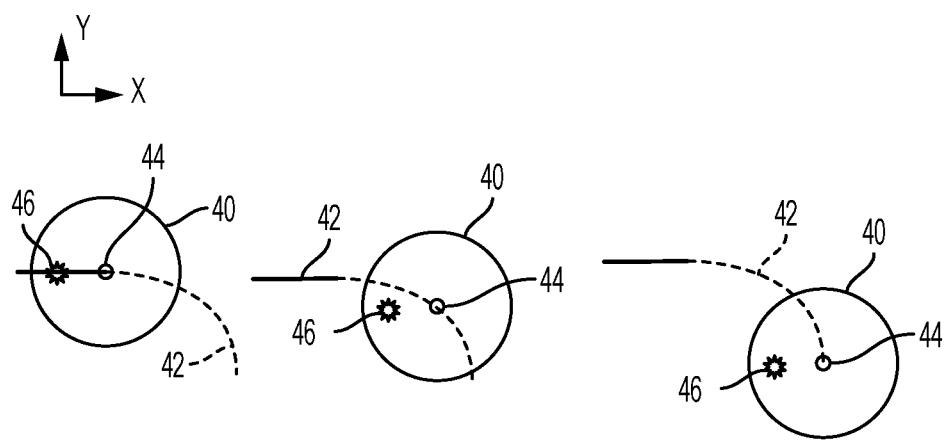
FIGS. 6-9 show examples of a curing path versus a deposition path.

In the embodiments discussed here, the curing device 40 can move in an arbitrary path with respect to the x/y plane. With fixed curing, curves in the deposition process prevent the laser from properly being directed to the deposited material. FIG. 6 shows a graphical representation of this problem. On the far left side of the diagram, the curing platform 40 has a curing component 46, such as a UV LED or heating element, which falls in line with the deposition path, shown by the line 42. The circle 44 represents the dispensing tip. As can be seen in the middle diagram, as the dispensing tip moves along the deposition path, the curing component no longer lies in line with the deposition path. In the left diagram, the curing component 46 lies even further off the deposition path 42.

Figure 7:
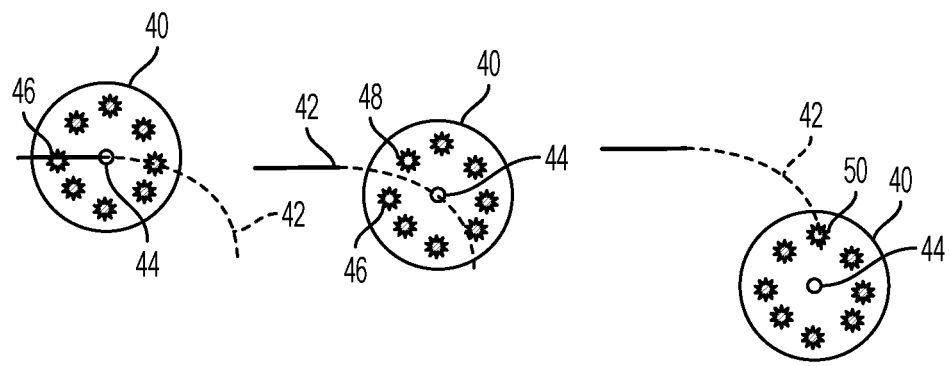

FIG. 7 shows one embodiment of the curing platform 40 having an array of LEDs such as 46. Similar to FIG. 6, the right side diagram shows the curing component 46 in line with the deposition path 42. In the middle diagram, as the dispensing tip moves along the deposition path, and it lies between two of the array, but in the right diagram as the path curves, another component 50 has moved into the deposition path. By providing an array of curing components, the amount of deposited material that goes uncured, or that has a delay before curing, had been reduced considerably.

Figure 8:
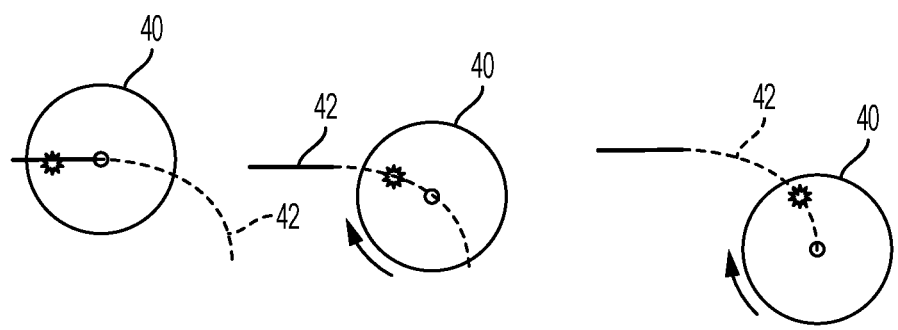
Figure 9:
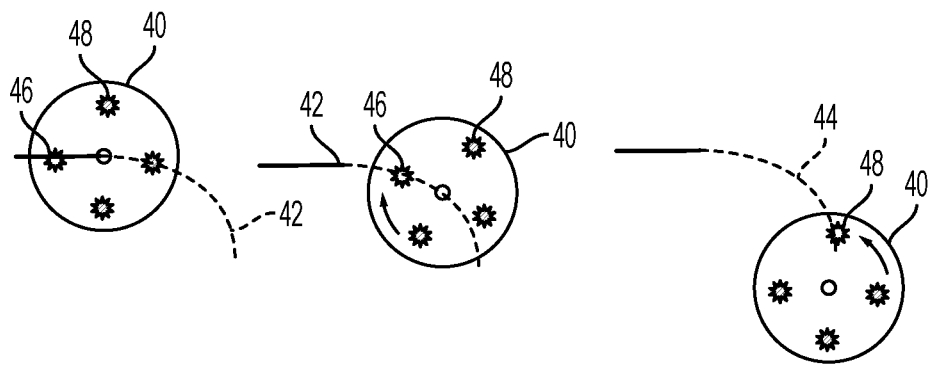

FIG. 8 shows another embodiment of a platform having a single curing component but now has the ability to rotate as needed. In FIG. 8, in the middle diagram, as the print head moves along the deposition path 42, the platform 40 rotates to keep the curing component in line with the deposition tip. As the print head continues to move along the deposition, the platform rotates as needed to ensure the component remains in line. FIG. 9 shows an approach that combines the array of components and rotation. This reduces the number of LEDs needed as compared to the embodiments of FIG. 7 and the additional LEDs reduce the amount of rotation needed as compared to the embodiments of FIG. 8 while still maintaining the integrity of the curing path relative to the deposition path.

Figure 10:
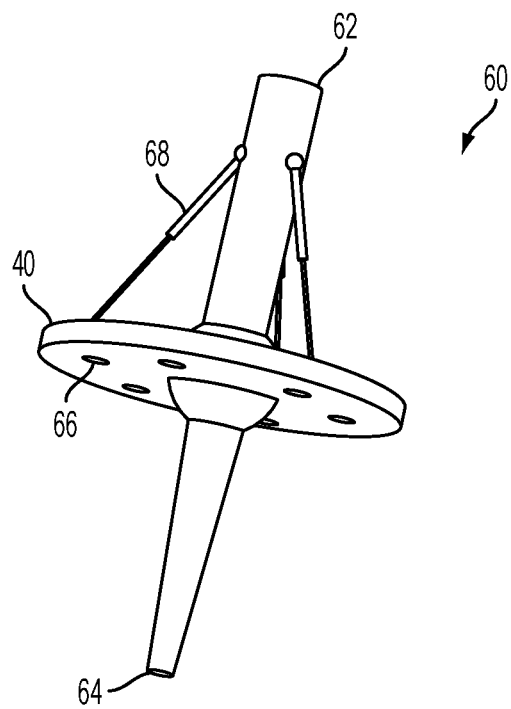
FIGS. 10-13 show embodiment of a curing device integrated with a deposition head.
Figure 11:
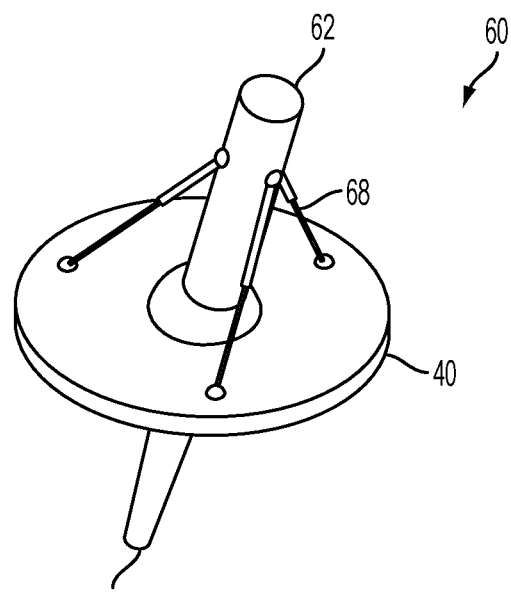

FIGS. 10 and 11 shows one embodiment of a curing device that integrates with, but moves independently of, the print head. The curing device 60 has a dispensing tip 62 that dispenses material received from at least one reservoir coupled to the non-dispensing end 62. The platform 40 connects to the dispensing tip through one or more linear actuators such as 68. The platform 40 has at least one curing component, such as 66 that is on a surface of the curing component 40. In one embodiment, the curing component has an array of curing components, and the curing components may be LEDs, heaters or other types of curing components.

The array of curing components may be positioned to provide curing at different distances from the dispensing tip. For example, the array of curing components may form circles or rings around the dispensing tip, each at a different distance from the tip. The system could then select which circle to activate depending upon the material being cured.

The array of curing components can also be spaced so that each curing component provides a curing area that is equidistant when perpendicular to the nozzle, but at a different angular alignment to the tip. In this case, the curing device which lines closest the the direction of motion can be used.

Figure 12:
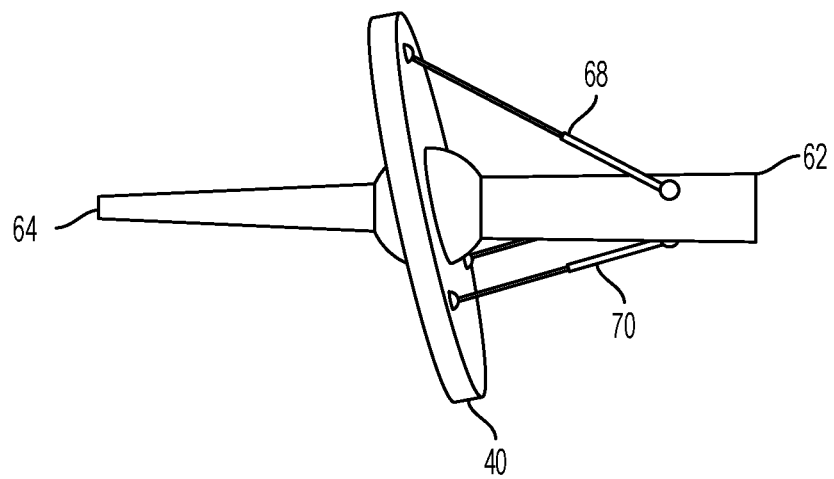
Figure 13:
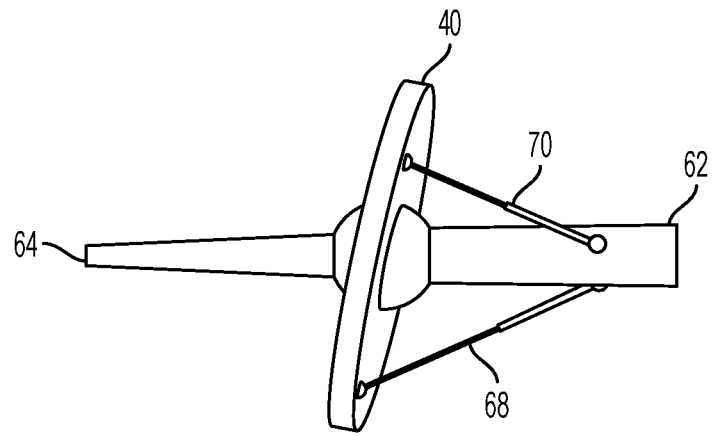

The actuators such as 68 define the plane of the curing component as well as control the rotation. FIGS. 12 and 13 show side views of the curing device 60. In one embodiment, the actuators cause the platform 40 to undergo a plane change from tilted from left to right in FIG. 12 to being tilted from right to left in FIG. 13.

These actuators are connected to both the dispensing component and the curing plane through a joint capable of motion in 3 axis. This joint can be a ball-joint, with rotational freedom. Because the joint has rotational freedom, controlling the length of the linear actuator can control both the rotation and angle relative to the dispensing tip of the curing plane. For example, if the length of a single actuator is increased the angle of the plane will change such that point closer to the actuator whose length is changed in closer to the dispensing tip. If the length of all three linear actuators is changed, the relative alignment of the curing plane will not change, but instead the plane will rotate around the axis of the dispensing tip. In this manner, the direction of any curing energy can be directed in all directions independently of the axis of dispensing with minimal points of control and complexity.

Figure 14:
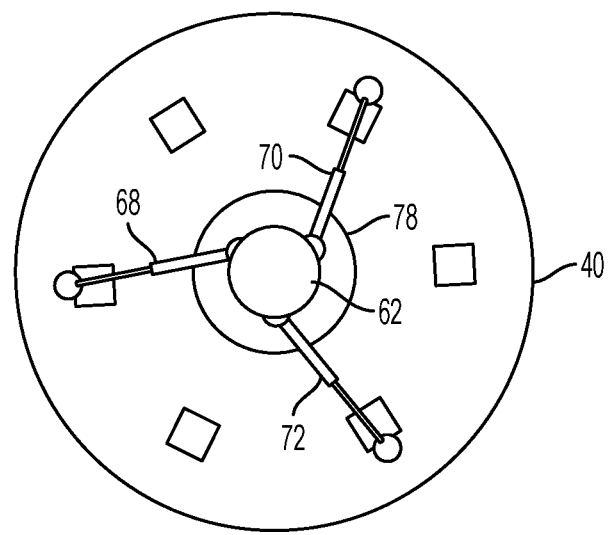
FIG. 14-15 show views of an embodiment of actuators attached to a curing platform.
Figure 15:
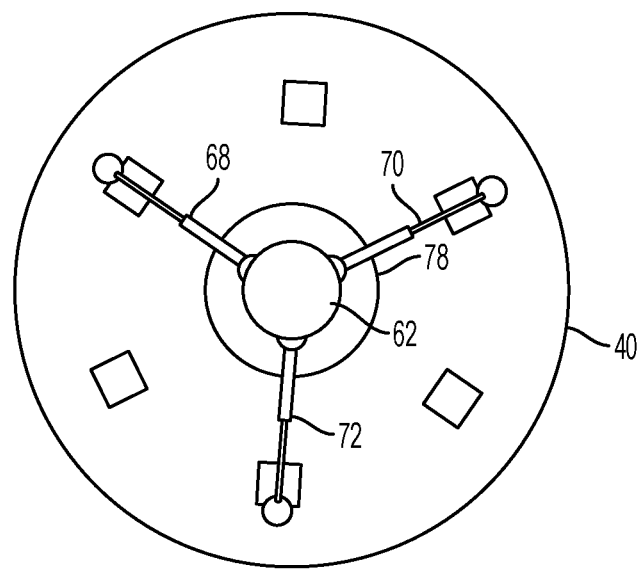

FIGS. 14 and 15 show a top view of the curing component. The three linear actuators can cause rotation by having a bias slightly to one side, or a stop, on the actuators. The bias may occur by making one of the actuators 68, 70 or 72, longer equally. As platform moves, the difference in lengths will cause the disk to rotate. As shown in these figures, the curing platform consists of a disk, either circular as shown or any shape, having an aperture 78 through which the dispensing tip 62 inserts.

Figure 16:
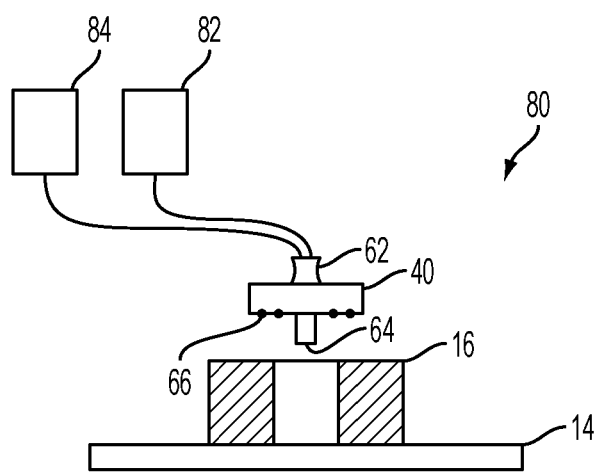
FIG. 16 shows an embodiment of a 3D curing system having an integrated curing device.

FIG. 16 shows a portion of an embodiment of a 3D depositing system having an integrated, independent, curing device. In the system 80, the reservoirs 84 and 82 provide the construction and supporting materials as needed to the end 62 of the dispensing tip 64. The curing platform 40 surrounds the dispensing tip 62. The platform has at least one curing component 66. As the print head moves to deposit the material that constructs the object, the platform moves, shifts and rotates as needed to allow the curing energy to be applied to the material.

Figure 17:
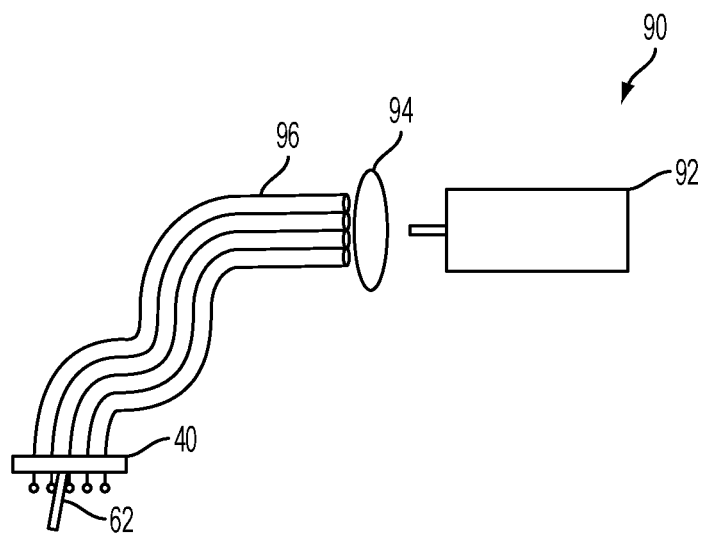
FIGS. 17-18 show views of an embodiment of a curing system using an optical fiber bundle.
Figure 18:
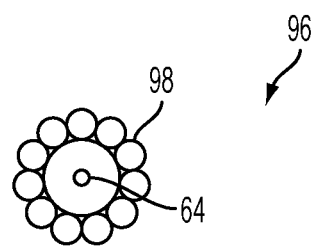

FIGS. 17-18 show an alternative embodiment of a curing platform 90. In this embodiment, the curing platform consists of a bundle of optical fibers coupled to the platform 40. The platform allows light from the laser 92, coupled to the bundle of fibers 96 through a lens 94. This allows the curing energy to reach the deposition surface. FIG. 18 shows an end view of the bundle from the perspective of the dispensing tip. The platform 40 allows the ends of the fibers to face the deposition surface.

In this manner, a curing device that functions independently from, but is integrated with, the deposition tip moves to allow curing. The curing components have a dynamic relationship with the dispensing tip being able to move independently to provide curing in all orientations and positions of the deposition head.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A curing device, comprising:
    a curing platform having at least one curing component arranged on a surface of the curing platform facing a print direction;
    a ball joint connecting the curing platform to a dispensing tip such that the curing platform is rotatable about an axis of the print direction; and
    at least one actuator connecting the curing platform to the dispensing tip, the curing platform positioned to apply energy from the curing component to material dispensed by the tip.
2. The curing device of claim 1, wherein the at least one actuator comprises three actuators.

3. The curing device of claim 1, wherein the curing platform comprises a disk having a central aperture through which the dispenser tip inserts.

4. The curing device of claim 3, wherein the aperture through which the disk and dispenser tip connects comprises the ball joint.

5. The curing device of claim 1, wherein the curing component comprises at least one of a bundle of optical fibers.

6. The curing device of claim 5, wherein the curing component comprises a laser optically connected to the bundle of optical fibers.

7. The curing device of claim 1, wherein the at least one curing component comprises a light emitting diode.

8. The curing device of claim 1, wherein the at least one curing component comprises an array of light emitting diodes, with diodes at predetermined distances from the dispensing tip.

9. The curing device of claim 1, wherein the at least one curing component comprises at least one heating element.

10. The curing device of claim 1, wherein the dispensing tip dispenses a curable polymer, curable by the curing component.

11. The curing device of claim 1, wherein the at least one actuator comprises a linear actuator.

12. The curing device of claim 2, wherein at least one of the three actuators differs from the other actuators to bias the curing platform to one side.

13. A three-dimensional printing system, comprising:
a reservoir of curable material;
a dispensing tip connected to the reservoir;
a curing platform surrounding the dispensing tip, the curing platform having at least one curing component arranged on a surface of the curing platform facing a print direction;
a ball joint connecting the curing platform to the dispensing tip such that the curing platform is rotatable around an axis of a print direction; and
at least one actuator connecting the curing platform to the dispensing tip.

14. The curing device of claim 13, wherein the curing component comprises at least one optical fiber.

15. The curing device of claim 14, wherein the curing component comprises a bundle of optical fibers and a laser optically connected to the bundle of optical fibers.

16. The curing device of claim 13, wherein the at least one curing component comprises a light emitting diode.

17. The curing device of claim 13, wherein the at least one curing component comprises an array of light emitting diodes, with diodes at predetermined distances from the dispensing tip.

18. The curing device of claim 13, wherein the at least one curing component comprises at least one heating element.

19. The curing device of claim 13, wherein the at least one actuator comprises a linear actuator.

20. The curing device of claim 13, wherein the at least one actuator comprises three actuators.

21. A curing device, comprising:
a curing platform having at least one curing component arranged on a surface of the curing platform facing a print direction;
a ball joint connecting the curing platform to the dispensing tip; and
three linear actuators connecting the curing platform to the dispensing tip such that the curing platform is rotatable about an axis of the print direction.

\* \* \* \* \*